United States Patent
Tsai et al.

[11] Patent Number: 5,969,845
[45] Date of Patent: Oct. 19, 1999

[54] DEVICE AND METHOD FOR DETERMINING RESOLUTION OF A MULTIPLE RESOLUTION SCANNER

[75] Inventors: Jeun-Tsair Tsai, Taipei Hsien; Te-Chih Chang, Hsin-Chu, both of Taiwan

[73] Assignee: Mustek Systems Inc., Hsin-Chu, Taiwan

[21] Appl. No.: 09/153,875

[22] Filed: Sep. 16, 1998

[51] Int. Cl.$^6$ .................................................. G02B 26/08

[52] U.S. Cl. .......................... 359/210; 359/196; 358/474; 358/497

[58] Field of Search .................................... 359/196–226; 355/55–59; 358/474, 487, 497

[56] References Cited

U.S. PATENT DOCUMENTS

| | | | |
|---|---|---|---|
| 5,610,755 | 3/1997 | Ohtsuka | 359/210 |
| 5,621,563 | 4/1997 | Brook et al. | 359/210 |

*Primary Examiner*—James Phan
*Attorney, Agent, or Firm*—Winston Hsu

[57] ABSTRACT

The present invention provides a device and a method for determining the resolution of a multiple resolution scanner. The scanner comprises a housing with a transparent platform for placing a document, a scanning module movably installed in the housing, a driving device installed in the housing for driving the scanning module to scan the document, a calibration region installed in the housing with an identification mark, and a control circuit installed in the housing for controlling the operation of the scanner. The scanning module comprises a case with an opening on its top for receiving the light from the document, a sensor installed in the case for transforming the light from the document into corresponding image signals, a lens module installed in the case for converging the light from the document onto the sensor wherein the resolution of the lens module is variable, and a lens module control device installed in the case for changing the resolution of the lens module. The control circuit processes the image signals generated by the scanning module and controls the lens module control device to change the resolution of the lens module. When the control circuit determines the resolution of the lens module, it uses the driving device to move the scanning module into the calibration region, uses the scanning module to scan the calibration region to get the image signal corresponding to the identification mark, and then determines the resolution of the lens module according to the image signal corresponding to the identification mark.

11 Claims, 3 Drawing Sheets

DEVICE AND METHOD FOR DETERMINING RESOLUTION OF A MULTIPLE RESOLUTION SCANNER

BACKGROUND OF THE INVENTION

1. Field of the Invention

The present invention relates to a scanner, and more particularly, to a multiple resolution scanner comprising device and method for determining its resolution.

2. Description of the Prior Art

A multiple resolution scanner commonly comprises a lens module which has several lenses with different resolutions movably installed in the scanner. Moving or rotating the lenses allows changing of the resolution of the scanner. The lens module further comprises more than one lens detector for detecting the positions of the lenses to determine which resolution is currently being used.

Please refer to FIG. 1. FIG. 1 is a schematic diagram of a prior art lens module 10. The lens module 10 comprises two lens detectors 12,13 for detecting the lens currently in use. The lens detector 12 is used for detecting a first lens 14 and the lens detector 13 is used for detecting a second lens 16. When the lens detector 12 detects that the first lens 14 is in use, it generates a detecting signal to indicate that the resolution of the first lens 14 is the present resolution of the lens module 10. Similarly, when the lens detector 13 detects that the second lens 16 is in use, it generates a detecting signal to indicate that the resolution of the second lens 16 is the present resolution of the lens module 10. The resolution of the lens module is determined based on the signal of the lens detector 12 or 13, therefore if the lens detectors 12,13 are worn out, it will be impossible to determine the resolution of the lens module 10. Moreover, if there are additional lenses of differing resolutions in the lens module 10, the structure becomes more complicated thus driving up costs.

SUMMARY OF THE INVENTION

It is therefore a primary objective of the present invention to provide a resolution determining device and method for determining the resolution of a multiple resolution scanner based on image signals generated by scanning an identification mark.

In a preferred embodiment, the present invention provides a scanner comprising:

- a housing having a transparent platform on its top for placing a document;
- a scanning module movably installed in the housing having:
  - a case with an opening on its top for receiving light from the document;
  - a sensor installed in the case for transforming the light from the document into correspondent image signals;
- a lens module installed in the case for converging the light from the document onto the sensor; wherein the resolution of the lens module is variable;
- a lens module control device installed in the case for changing the resolution of the lens module;
- a driving device installed in the housing for driving the scanning module;
- a control circuit installed in the housing for controlling operations of the scanner, processing the image signals generated by the scanning module, and controlling the lens module control device to change the resolution of the lens module; and
- a calibration region installed in the housing with an identification mark.

When determining the resolution of the lens module, the scanning module is moved by the driving device under the control of the control circuit to scan the calibration region and get the image signals of the identification mark wherein the resolution of the lens module is determined by the control circuit according to the image signal of the identification mark.

These and other objectives of the present invention will no doubt become obvious to those of ordinary skill in the art after reading the following detailed description of the preferred embodiment which is illustrated in the various figures and drawings.

DETAILED DESCRIPTION OF THE PREFERRED EMBODIMENT

Figure 1:
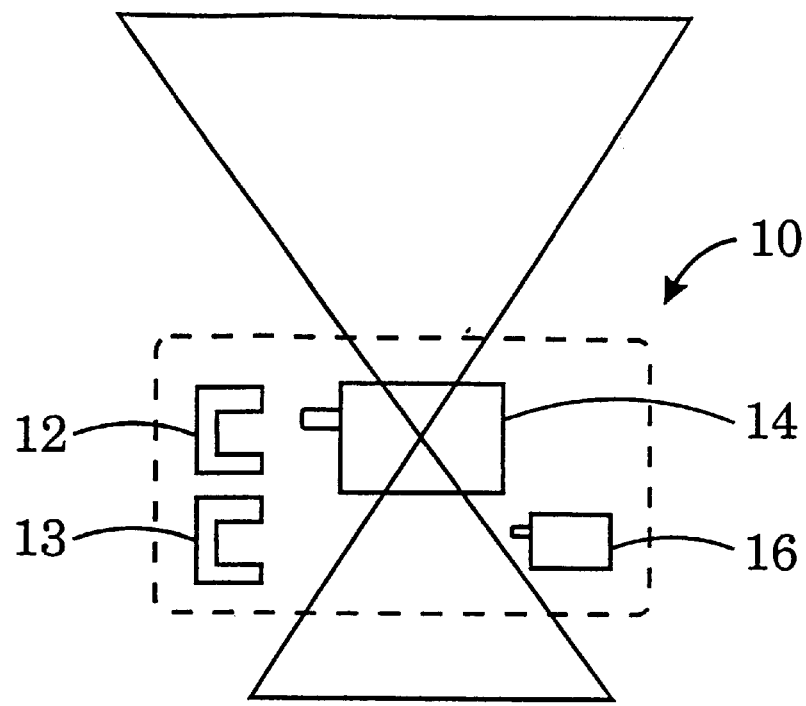
FIG. 1 is a schematic diagram of a lens module according to the prior art.
Figure 3:
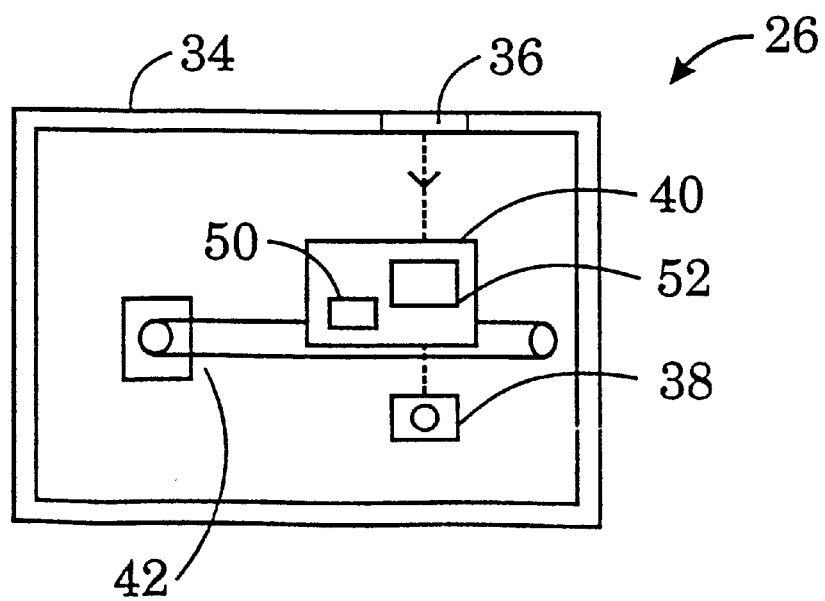
FIG. 3 is a sectional view along line 3—3 of the scanning module shown in FIG. 2.
Figure 2:
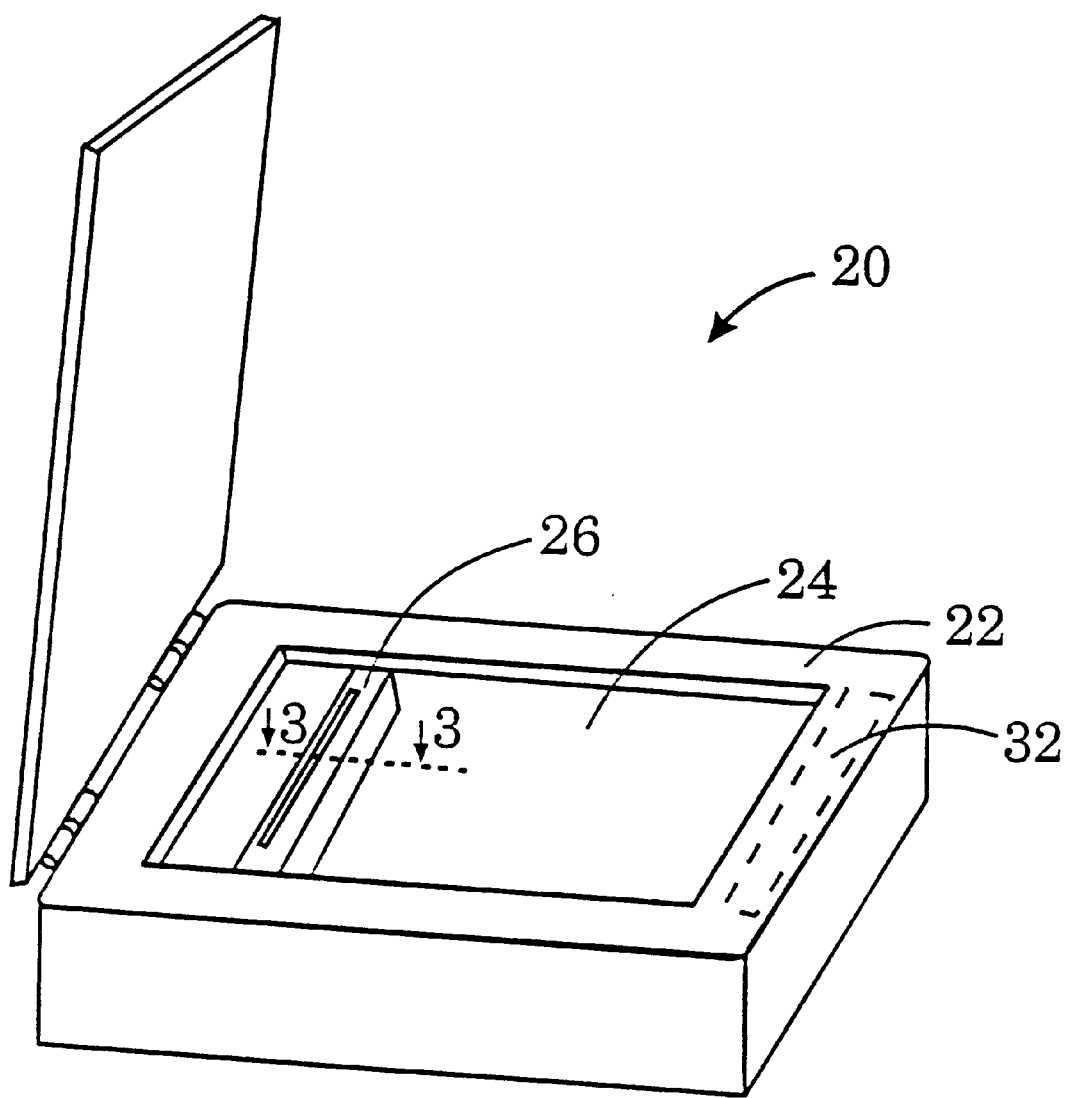
FIG. 2 is a schematic diagram of a scanner according to the present invention.
Figure 4:
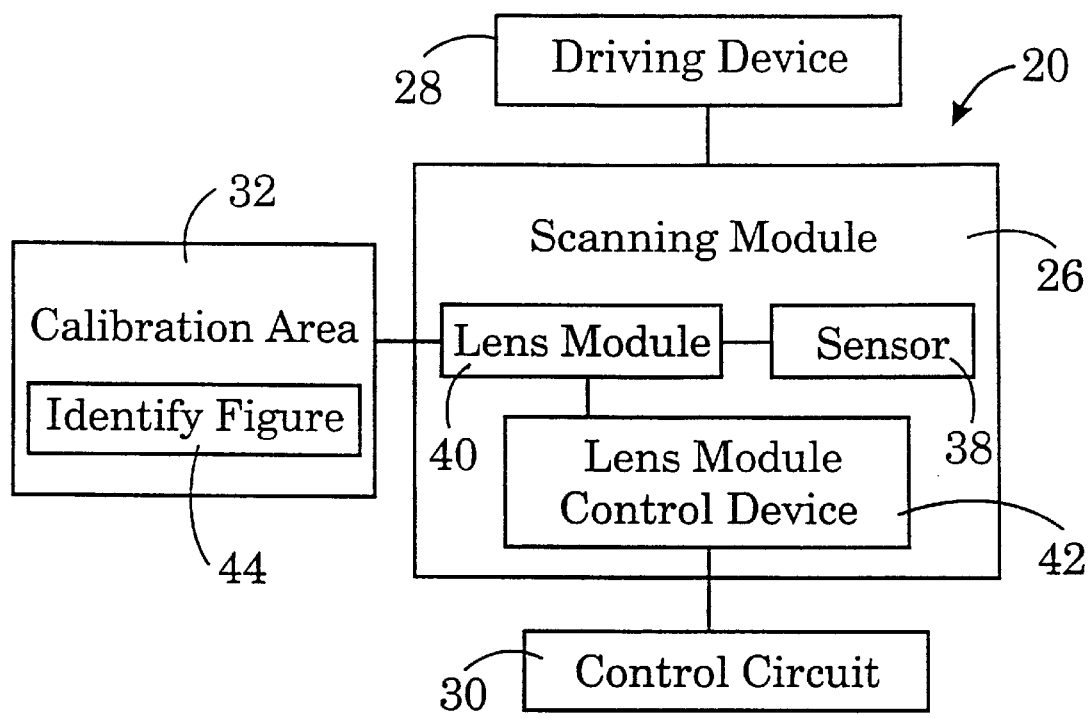
FIG. 4 is a function block diagram of the scanner shown in FIG. 2.

Please refer to FIG. 2, FIG. 3, and FIG. 4. FIG. 2 is a schematic diagram of a scanner 20 according to the present invention, FIG. 3 is a sectional view along line 3—3 of the scanning module 26 shown in FIG. 2, and FIG. 4 is a function block diagram of the scanner 20 shown in FIG. 2. The scanner 20 comprises a housing 22 with a transparent platform 24 on its top for placing a document, a scanning module 26 movably installed in the housing, a driving device 28 installed in the housing 22 for driving the scanning module 26 to scan the document, a control circuit 30 installed in the housing 22 for controlling the operation of the scanner 20 and processing the image signals generated by the scanning module 26, and a calibration area 32 installed in the housing with an identification mark 44. The scanning module 26 comprises a case 34 with an opening 36 on top for receiving the light from the document, a sensor 38 installed in the case 34 for transforming the light into corresponding image signals, a lens module 40 with variable resolution comprising two different lenses 50,52 installed in the case 34 for converging the light from the document onto the sensor 38, and a lens module control device 42 installed in the case 34 for changing the resolution of the lens module 40. The control circuit 30 moves the lens 50 or 52 to the front of the sensor 38 by using the lens module control circuit 42 and therefore changes the resolution of the lens module 40.

Figure 5:
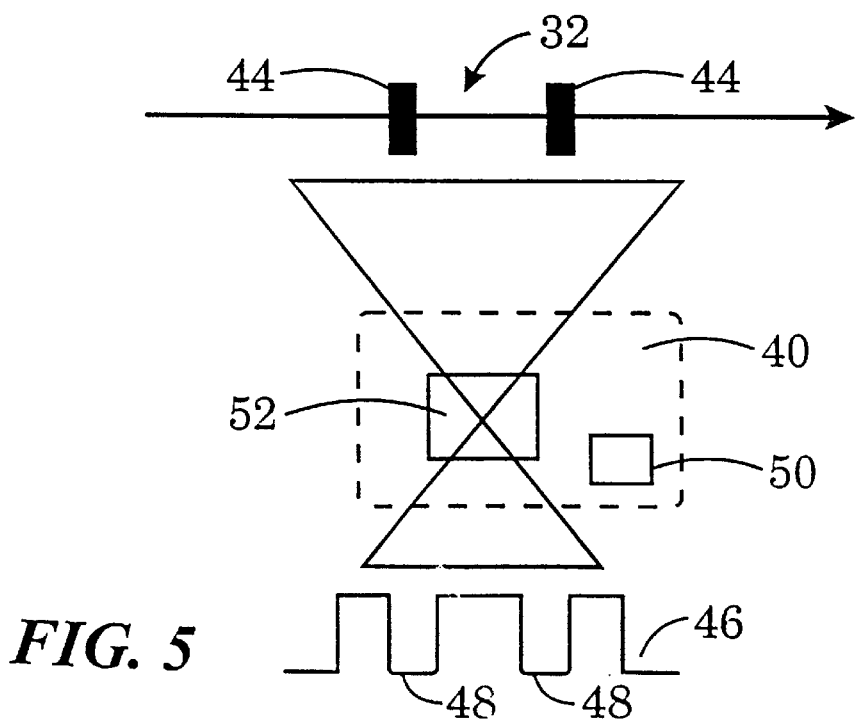
FIG. 5 is a schematic diagram of the scanning module scanning the calibration area shown in FIG. 2.

Please refer to FIG. 5. FIG. 5 is a schematic diagram of the scanning module 26 scanning the calibration region 32 shown in FIG. 2. The control circuit 30 pre-stores two widths 48 of image signals which are generated by scanning the identification mark 44 using the lens module 40 under two different resolutions. The widths 48 stored in the control circuit 30 are used as width references. To determine the resolution of the lens module 40, the control circuit 30 first moves the scanning module 26 into the calibration region 32 by using the drive device 28 then scans the calibration region 32 by using the scanning module 26 to generate the image signal 46 corresponding to the identification mark 44. The control circuit 30 then calculates the width 48 of the image signal 46 and compares it with the pre-stored width references to determine the resolution of the lens module 40. The identification mark 44 of the calibration region 32 must allow the lenses 50,52 of the lens module 40 to generate different image signals which in turn allow determination of the resolution of the lens module. The identification mark 44 need not be identical to the two black strips shown in FIG. 5. The identification mark 44 can also be made of only one strip and the width of the strip or the position of the strip projected on the sensor may be used as a reference.

The method for determining the resolution of the lens module 40 comprises the following steps:

(1) moving the scanning module 26 into the calibration area 32 by using the driving device 28, and using the scanning module 26 to scan the calibration region 32 to obtain the image signal 46 corresponding to the identification mark 44;

(2) determining the resolution of the lens module 40 by comparing the width of the image signal 46 with the width reference of the lens module 40 under different resolutions.

Unlike the prior art multiple resolution scanners, the present invention determines the resolution of the lens module 40 by using the image signal 46 generated by scanning the identification mark 44 in the calibration region and as such does not need complicated lens detectors. This lowers the cost of the scanner 20.

Those skilled in the art readily observe that numerous modifications and alterations of the device may be made while retaining the teachings of the inventions. Accordingly, the above mentioned disclosure should be construed as limited only by the metes and bounds of the appended claims.

What is claimed is:

1. A scanner comprising:
    a housing having a transparent platform on its top for placing a document, to be scanned;
    a scanning module movably installed in the housing having:
        a case with an opening on its top for receiving light from the document;
        a sensor installed in the case for transforming the light from the document into corresponding image signals;
        a lens module installed in the case with variable resolution for converging the light from the document onto the sensor; and
        a lens module control device installed in the case for changing the resolution of the lens module;
    a driving device installed in the housing for driving the scanning module to scan the document;
    a control circuit installed in the housing for controlling operations of the scanner, processing the image signals generated by the scanning module, and changing the resolution of the lens module by using the lens module control device; and
    calibration region installed in the housing comprising an identification mark;
    wherein when determining the resolution of the lens module, the scanning module is moved by the driving device under the control of the control circuit to scan the calibration region and get the image signals of the identification mark wherein the resolution of the lens module is determined by the control circuit according to the image signal of the identification mark.

2. The scanner of claim 1 wherein the control circuit uses the image signal of the identification mark to obtain the width of the identification mark, and then uses the width to determine the resolution of the lens module.

3. The scanner of claim 2 wherein the control circuit determines the resolution of the lens module by comparing the width of the identification mark with pre-stored width references of the lens module in various resolutions.

4. The scanner of claim 1 wherein the lens module comprises a plurality of lenses, and the lens module control device can move each of the lenses individually to the front of the sensor so as to form various resolutions.

5. Method for determining resolution of a scanner which comprises:
    a housing having a transparent platform for placing a document;
    a scanning module movably installed in the housing comprising:
        a case with an opening on its top for receiving light from the document;
        a sensor installed in the case for transforming the light from the document into corresponding image signals;
        a lens module installed in the case with variable resolution for converging the light onto the sensor; and
        a lens module control device installed in the case for changing the resolution of the lens module;
    a driving device installed in the housing for driving the scanning module to scan the document;
    a calibration region installed in the housing comprising an identification mark;
    the resolution determination method comprising:
        moving the scanning module to the calibration region by using the driving device and using the scanning module to scan the calibration region to get the image signals of the identification mark; and
        determining the resolution of the lens module according to the image signals of the identification mark.

6. The resolution determination method of claim 5 wherein the width of the identification mark is determined first according to the image signals of the identification mark and then the resolution of the lens module is determined according to the width of the identification mark.

7. The resolution determination method of claim 6 wherein the resolution of the lens module is determined by comparing the width of the identification mark with pre-stored width references of the lens module in various resolutions.

8. The resolution determination method of claim 5 wherein the lens module comprises a plurality of lenses, and the lens module control device can move each of the lenses individually to the front of the sensor so as to form various resolutions.

9. A scanner comprising:
    a housing having a transparent platform on its top for placing a document to be scanned;
    a sensor for transforming the light from the document into corresponding image signals;
    a lens module with variable resolution for converging the light from the document onto the sensor;
    a scanning module movably installed in the housing for transmitting the light from the document to sensor through the lens module;

a driving device installed in the housing for driving the scanning module to scan the document;

a control circuit installed in the housing for controlling operations of the scanner; and a calibration region installed in the housing comprising an identification mark;

wherein when determining the resolution of the lens module, the scanning module is moved by the driving device under the control of the control circuit to scan the calibration region and get the image signals of the identification mark wherein the resolution of the lens module is determined by the control circuit according to the image signal of the identification mark.

10. The scanner of claim 9 wherein the scanning module comprises a case with an opening on its top for receiving the light from the document and wherein the lens module and sensor are installed in the case of the scanning module.

11. The scanner of claim 10 wherein the scanning module further comprises a lens module control device installed in the case for changing the resolution of the lens module under the control of the control circuit.

* * * * *